(No Model.) 2 Sheets—Sheet 1.

F. H. BUZZACOTT.
PORTABLE BAKE OVEN.

No. 434,242. Patented Aug. 12, 1890.

Witnesses:
Chas. L. Taylor
R. A. Balderson

Inventor:
F. H. Buzzacott,
By his Attys,
Higdon & Higdon (No Model.) 2 Sheets—Sheet 2.

F. H. BUZZACOTT.
PORTABLE BAKE OVEN.

No. 434,242. Patented Aug. 12, 1890.

Witnesses:—

Inventor:
F. H. Buzzacott.
By his Attys.
Higdon & Higdon

UNITED STATES PATENT OFFICE.

FRANCIS HENRY BUZZACOTT, OF FORT SUPPLY, INDIAN TERRITORY.

PORTABLE BAKE-OVEN.

SPECIFICATION forming part of Letters Patent No. 434,242, dated August 12, 1890.

Application filed December 27, 1889. Serial No. 335,157. (No model.)

*To all whom it may concern:*

Be it known that I, FRANCIS HENRY BUZZACOTT, of Fort Supply, Indian Territory, have invented certain new and useful Improvements in Portable Bake-Ovens, of which the following is a full, clear, and exact description, reference being had to the accompanying drawings, forming a part hereof.

My invention relates to improvements in portable bake-ovens for outdoor uses; and it consists in the novel construction and arrangements, hereinafter more fully set forth and described.

Figure 1:
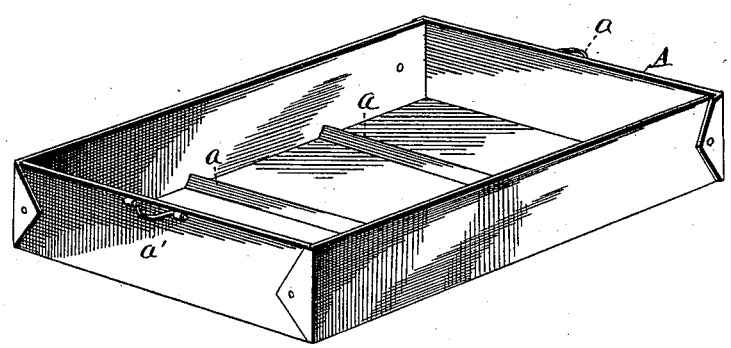
Figure 2:
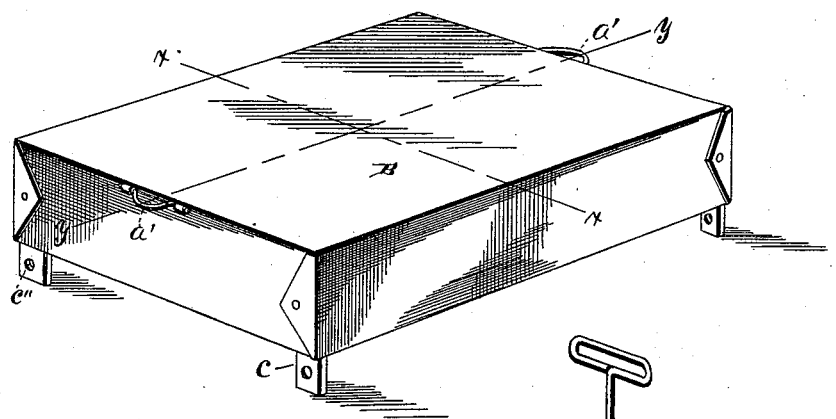
Figure 6:
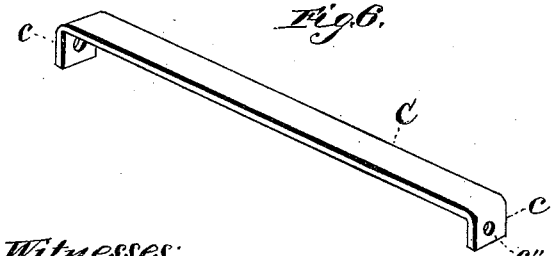
Figure 7:
Figure 3:
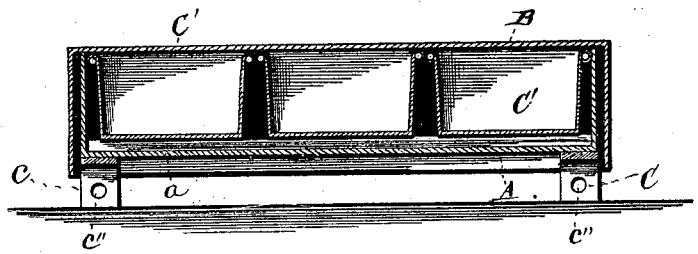
Figure 4:
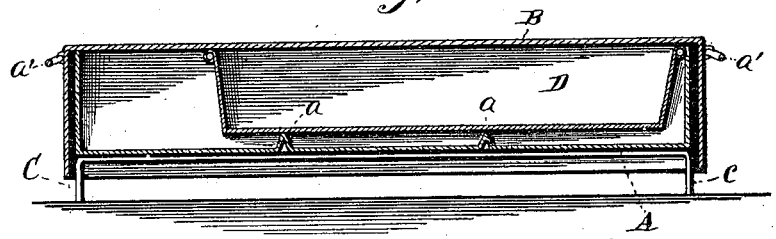
Figure 5:
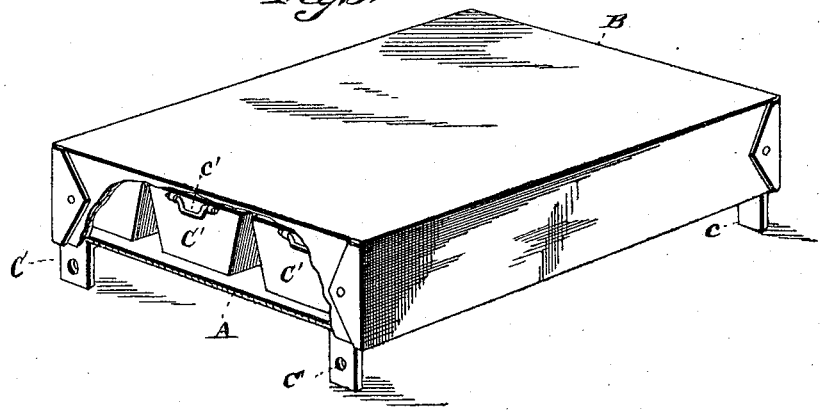

In the drawings which illustrate the manner of carrying out my invention, Figure 1 is a perspective view of the bake-oven with the hood removed. Fig. 2 is a perspective view of same with a hood or covering placed over it. Fig. 3 is a cross-section of same, taken on line $x\,x$ of Fig. 2. Fig. 4 is a transverse section taken on line $y\,y$ of Fig. 2. Fig. 5 is a perspective view of the bake-oven, showing the end partly broken away, revealing the baking-pans in position on the inside. Fig. 6 is a detail in perspective of the supports on which said oven rests, and Fig. 7 is a detail in perspective of the lifting-hook used for removing the lid.

Referring to the drawings by letter, A represents an oven constructed of sheet metal, as illustrated in Fig. 1, being provided on the inside with rests $a$, which form bearings for smaller baking-pans C', thus leaving an air-chamber around them, through which the hot air circulates.

B is a hood made similar in shape and design, but larger, and deep enough to cover said oven A and extend down below the base thereof in such a manner as to retain the heat.

C is a horizontal bar having its ends $c$ bent in such a manner as to form suitable supports for said oven. $c''$ are perforations in said supports $c$, by which the oven is transported to any desired locality. This may be done by running any suitable bar through the perforation and raising it from the ground.

D is a pan made larger than those marked C', (represented in Fig. 3,) which may be placed in the main oven when so desired.

$c'$ are suitable handles provided for smaller baking-pans C', by which they are lifted in and out of the oven.

$a'$ are handles properly secured to the hood or covering B, by which it is raised from the bake-oven A by using the lifting-hook F, said hook F being provided with a suitable handle. This portable oven is designed to be used for outdoor purposes, and will be found very convenient in army or camp life.

Having thus fully described my invention, what I claim as being new, and desire to secure by Letters Patent, is—

A portable bake-oven comprising in its structure the pan A, supported above the ground and having ledges $a$ inside of it, the pan D, supported on said ledges, and the hood B, having open bottom and sides of a depth greater than the height of pan A, but less than the combined height of pan A and its supports C, whereby room is left under the oven for fire, the tops of pans A and D being closed by hood B, and a hot jacket or chamber provided in hood B around pan A, as set forth.

In testimony whereof I affix my signature in presence of two witnesses.

FRANCIS HENRY BUZZACOTT.

Witnesses:
JAMES WILSON,
JAMES MATTHEW.